United States Patent Office 3,482,860
Patented Dec. 9, 1969

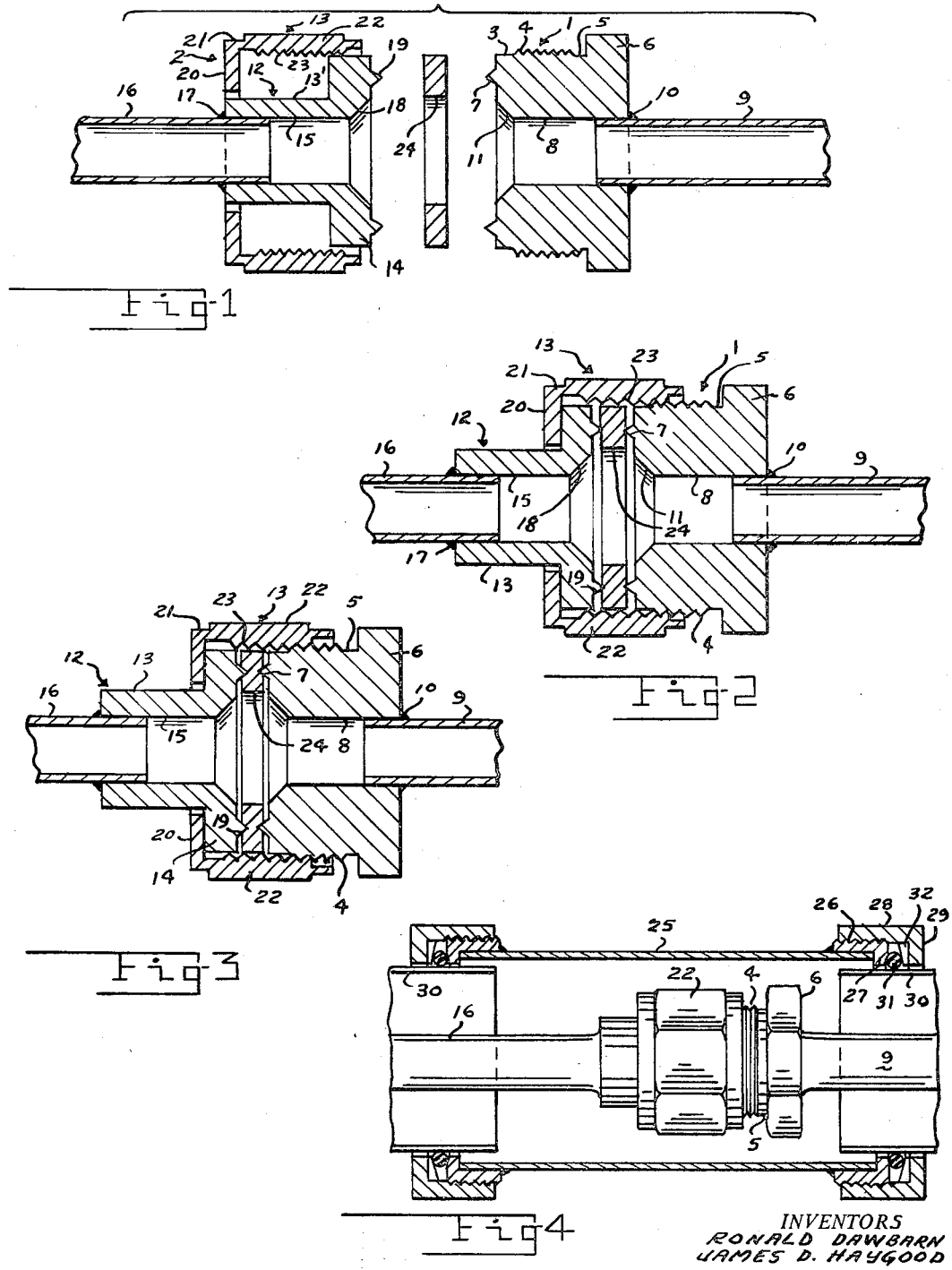

3,482,860
VACUUM TYPE ALL METAL CONNECTOR FOR TUBING
Ronald Dawbarn, Manchester, and James D. Haygood, Tullahoma, Tenn., assignors to the United States of America as represented by the Secretary of the Air Force
Filed Nov. 6, 1967, Ser. No. 681,038
Int. Cl. F16l *19/00, 33/18*
U.S. Cl. 285—354                                                                1 Claim

ABSTRACT OF THE DISCLOSURE

A coupling for quickly connecting and disconnecting cryogenic lines which effect an all-metal seal under extraordinary low temperatures. The seal is made up of a double-nut construction formed of two cylindrical members of metal attached to the ends of the conduits to be temporarily joined. One of the members is threaded and the other is without threads but is provided with a shoulder. A third member surrounds the unthreaded member and has threads which can be engaged by the threads of the threaded cylindrical member. The third member has a flange which abuts the shoulder of the unthreaded member when the threads of the third member engage those of the threaded cylindrical member.

There is a knife-edge projection secured to each of the juxtaposed surfaces of the two cylindrical members and directed toward one another. A ring of relatively soft metal is positioned between the two projections whereby when the cylindrical members are forced together by tightening the third member on the threaded cylindrical member, the two knife edges are caused to enter the metal of the ring from both sides to effect a seal between the cryogenic lines. The coupling lends itself to being contained within a vacuum jacket, a part of which is removable to provide access to the coupling.

BACKGROUND OF THE INVENTION

The present invention relates to couplings and more especially to device for bringing together without leakage a pair of aligned conduits which are conveying cryogenic fluids.

In transporting fluids of this character, it is necessary to eliminate rubber such as O-rings and also plastic washers because at low temperatures, for example, 4° K. (−269.16° C.), this material becomes brittle or changes its shape which may cause impairment of the seal. The trade, particularly for laboratory use, has a definite need for a coupling that cannot only stand these tremendously low temperatures but can also withstand subjection to heat, at least as high as 200° C.

SUMMARY OF THE INVENTION

An object of the invention is to provide a coupling of the type described and especially one that requires only the minimum amount of space to make and break the connection.

Another object is to provide a coupling that lends itself to being placed within a vacuum jacketed transfer line as a sealed connection but can be readily disconnected.

Another object is to provide a leak-proof connector for transferring cryogens into ultra high vacuum chambers.

Another object is to provide a tight coupling for cryogenic transfer lines at low cost, is relatively small in size, and can be placed in positions where other connectors could not be employed.

Other objects and features will be apparent as the specification is perused in connection with the accompanying drawing.

BRIEF DESCRIPTION OF THE DRAWING

FIG. 1 represents a sectional view of the improved connector, the parts of which are joined to tubing;

FIG. 2 is a view showing the manner in which the parts of the connector are screwed together and are caused to contact a soft metal washer, preparatory to effecting a good seal;

FIG. 3 shows a longitudinal sectional view of the connector fully tightened up; while FIG. 4 illustrates the manner in which the coupling can be contained in a vacuum jacket.

DESCRIPTION OF THE PREFERRED EMBODIMENT

These objects are attained, in brief, by providing a sharp annular knife-edge projection in the facing surfaces of the coupling members and positioning a ring of fairly soft metal between the surfaces. When the latter are brought together by a screw action, the annular knife edges bite into the ring and produce an absolutely air and liquid tight joint.

In the drawings, the couplings are formed of male and female members made of metal and generally designated 1, 2, respectively. The male member 1 is formed preferably of steel or brass and has a cylindrical shank 3 threaded as at 4 and a turned-down shoulder 5. The outer end of the shank 3 terminates in a fairly thick hexagon nut portion 6. The inner end of the member is provided with an annular wedge-shaped projection or knife edge 7. The member is bored as at 8 in order to tightly receive the end of a metal tubing or conduit 9 which is welded as at 10 to the outer end of the member 1. The inner end of the member is chamfered as indicated at 11.

The female portion 2 is composed of two parts 12 and 13, one surrounding the other and is also constituted of steel or brass. The inner part 12 has a fairly long shank 13' terminating at the right in a shoulder 14. The shoulder is preferably of the same diametrical size as the shank 3 of the companion portion. The female portion has a bore 15 which snugly fits the tubing or conduit 16 and is welded thereto as indicated at 17. The shoulder portion 14 is chamfered at 18 and is provided with an annular projection or knife edge 19 which is positioned directly opposite from the projection 7.

The portion 2 is provided with an inwardly extending flange 20 which fits over the shank of the part 12 but leaving a small clearance. There is a cylindrical portion 21 which extends longitudinally from the outer edge of the flange and carries a large hexagon nut 22 having internal threads 23 which can be engaged by the threaded male portion.

Directly in between the knife-edge projections 19, 7, there is a gasket or ring 24 of relatively soft metal, such as copper, of about one-eighth inch thick. The outer diameter of the ring is about the same as the diameter of the parts 14, 3, so that it is an easy matter to line up and hold the ring in place.

While the included angle at each knife edge is not particularly critical, I have obtained useful results in effecting a leak-tight seal by employing angles ranging from 50° to 90°.

In order to tighten the coupling, it is merely necessary to bring the male and female parts together so that the knife edges 19, 7 first contact and then bite into the ring. The threads 4, 23 will start to become engaged so that by turning the nut 22, while holding the nut 6 stationary, greater pressure is exercised on the ring surface and the knife edges 7, 19 will be caused to enter into the body of the ring as seen in FIG. 3. Thus, a complete seal is effected between the conduits 9, 16.

In order to break the connection, it is merely necessary to turn the nut 22 in the opposite direction than before which will cause the knife edges 19, 7 to withdraw from the ring 24.

The improved connector is extremely useful in conveying gases in a liquid form at extremely low temperatures in view of the complete absence of material such as rubber which deteriorates in the presence of extreme cold. In order to insulate the coupling and the immediate parts of the tubing as much as possible from room temperatures, it may be desirable to contain the coupling within a vacuum jacket formed by a metal cylinder 25 (FIG. 4). The cylinder is preferably considerably larger in size than the coupling. Each end of the cylinder is provided with a fixed rim welded thereto as indicated at 26 and extending over the edges as to leave a thick lip 27. The rim is threaded to receive the internal threads of a metal end cap 28 having an inwardly extending flange 29. Beyond the cylinder 25 there may be lengths of large tubing 30 to give whatever protection is desired to the remaining parts of the conduits 9, 16. It is apparent that a vacuum may be maintained within the cylinder 25 or, if desired, liquid gas may be provided at a temperature higher than that passing through the conduits 9, 16 in order to reduce the loss of "coldness" by radiation from the interior of the coupling.

O-rings 31 of any suitable and well-known type may be fitted between the lip 27 and the flange 29 in order to prevent leakage between the interior of the cylinder 25 and the tubing 30. The flange 29 may be provided with a form-fitting liner 32 for accommodating the curvature of the ring. Thus, in order to make a connect or disconnect at the couplings 1, 2, it is necessary to turn one of the end caps 28 until it becomes disengaged from the rim whereupon both rims and the intermediate cylinder 25 can be moved longitudinally to the right or left, sliding along the cylinder 30. This action will leave the couplings 1, 2 completely exposed either for the purpose of loosening the nut 22 to break the coupling or possibly to turn the nut in order to increase the pressure of the knife edges at the ring 24.

These disconnect or connect couplings 1, 2 have been made using fittings up to 1" in diameter. The included angle at the knife edge does not appear to be critical. Fittings with knife edge angles ranging from 50° to 90° have been constructed and found to be leakproof. The couplings have been used in supply lines carrying 20° K. gaseous helium and 4.2° K. liquid helium with no detectable helium leak and have maintained their vacuum integrity when heat shocked from plus 200° C. to minus 194° C.

It will be noted that the coupling employs only metal; there is no rubber, plastic or similar material used in its construction and this may account in some degree for the facility by which the coupling can be used for the transfer of cryogens, such as liquid helium, at the extraordinary low temperature of 4° K. The coupling is also able to retain its vacuum integrity when heat shocked from plus 200° C. to minus 194° C.

While a certain specific embodiment has been described, it is obvious that numerous changes may be made without departing from the general principle and scope of the invention.

We claim:
1. A coupling for sealing the ends of two pieces of tubing together, a pair of cylindrical members secured to the respective ends of the tubing, said members being bored tightly to receive the tubing at positions as to extend beyond the adjacent ends of the tubing, the bores in the members being chamfered at the surfaces facing one another, one of said members having screw threads on the exterior, and means including a hollow cylindrical member having screw threads on the interior surface which are adapted to engage the first-mentioned threads for moving said cylindrical members and the attached ends of the tubing toward one another, a knife-edge projection on each of the juxtaposed faces of said pair of cylindrical members, a ring of relatively soft metal positioned between said knife edges whereby when said threaded members are rotated with respect to one another so as to engage the threads, said knife edges are brought into contact with the ring and pressed into the metal of the ring, so that free movement of the metal under pressure is assured by accommodation within the space formed by said chamfered surfaces whereby the seals are effected at the knife edges and also at the side surfaces of the ring without distortion at the sealing surfaces.

References Cited

UNITED STATES PATENTS

| | | | |
|---|---|---|---|
| 1,595,310 | 8/1926 | Mueller et al. | 285—328 |
| 1,834,581 | 12/1931 | Ferrell et al. | 285—328 |
| 1,906,826 | 5/1933 | Smith et al. | 285—354 |
| 2,349,170 | 5/1944 | Jackman | 285—354 |
| 3,265,414 | 8/1966 | Reid et al. | 285—363 |
| 3,400,953 | 9/1968 | Sullivan | 285—354 |

DAVID J. WILLIAMOWSKY, Primary Examiner

W. L. SHEDD, Assistant Examiner

U.S. Cl. X.R.

285—386